Dec. 11, 1951

W. B. HAUSMAN 2,578,300

STEP PRINTER

Filed April 19, 1946

INVENTOR.
WARD B. HAUSMAN
BY
W. W. Williamson
ATTORNEY

Dec. 11, 1951     W. B. HAUSMAN     2,578,300
STEP PRINTER

Filed April 19, 1946     2 SHEETS—SHEET 2

INVENTOR.
WARD B. HAUSMAN
BY
ATTORNEY

Patented Dec. 11, 1951

2,578,300

UNITED STATES PATENT OFFICE 2,578,300

STEP PRINTER

Ward B. Hausman, Philadelphia, Pa.

Application April 19, 1946, Serial No. 663,487

5 Claims. (Cl. 95—75)

My invention relates to a new and useful step printer for motion picture films and has for one of its objects to provide an exceedingly simple and effective device of this character that will be compact and portable for easy transportation and relatively inexpensive in the cost of manufacture.

Another object of the invention is to provide an upright or vertically arranged lamp housing, so constructed as to enclose the majority of the operating mechanisms and mounted on a base carrying a bracket to receive the film reels.

Another object of the invention is to provide a unique means for adjusting the light aperture for regulating the amount of light reaching the films for printing purposes.

Another object of the invention is to provide a shutter operable in connection with the film feeding mechanism, whereby they may be properly timed relative to each other.

Another object of the invention is to provide a tension means including a colored transparent plate attached to an arm under spring tension and adapted to overlie light apertures.

Another object of the invention is to provide, in combination with other parts of the apparatus, a simple and improved film feeding mechanism.

With the above and other objects in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawings, in which.

Figures 1, 2:
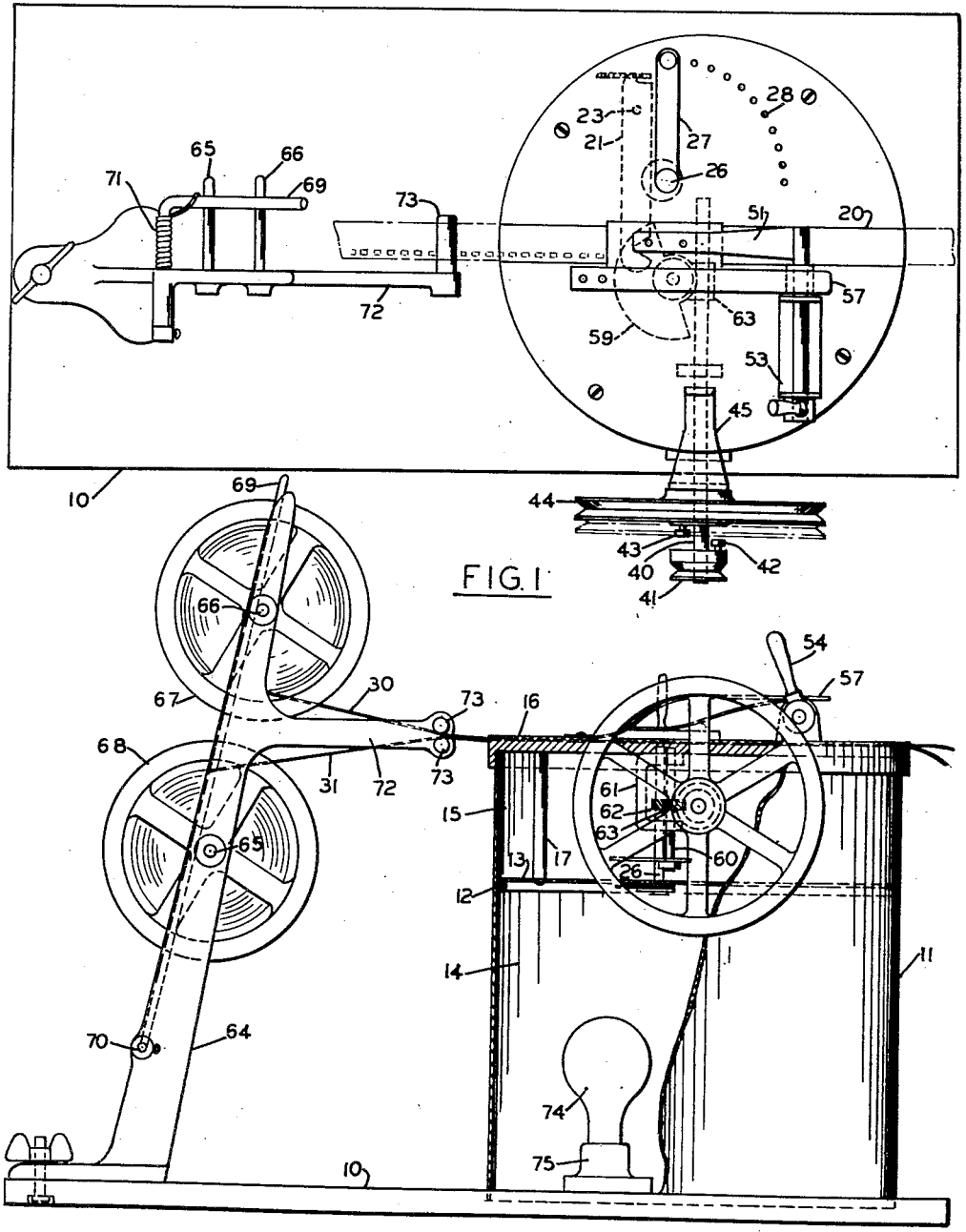
Fig. 1 is a top plan view of a step printer constructed in accordance with my invention, with the position of the films being indicated in dotted lines and the operable position of the clutch also being shown in dotted lines.
Fig. 2 is a side elevation thereof with the reels and films in place for the printing operations and a portion of the shell of the housing being broken away to illustrate the locations of some of the interior mechanism.
Figure 3:
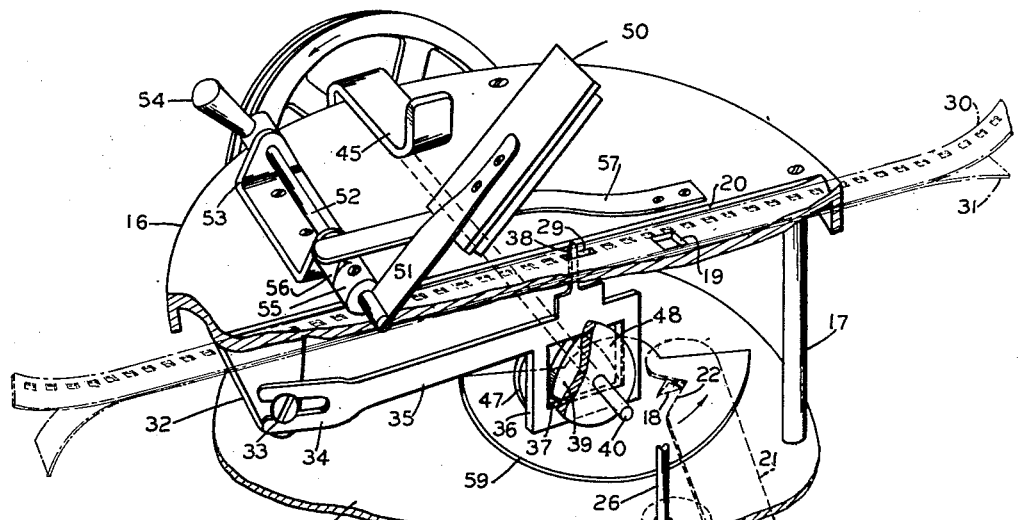
Fig. 3 is a fragmentary perspective view of a portion of the printer to illustrate some of the various details of construction.

In carrying out my invention as herein embodied, 10 represents a suitable support or base for the entire assembly and preferably comprises a panel of suitable material. Suitably mounted on top of the base 10 is a housing 11 in the form of a cylindrical body and the interior thereof is provided with any suitable means for supporting the frame, which for purposes of illustration is shown as rib 12.

The frame includes the inner or bottom plate 13, which functions as a partition to divide the interior of the housing into the lamp chamber 14 and the mechanism chamber 15. In addition to the plate 13 said frame includes a cap 16 mounted in spaced relation to the plate 13 and connected therewith by means of upright rods 17. The cap 16 has a flange to fit over the upper end of the housing shell or body.

The plate 13 has a triangular shaped light aperture 18 in perpendicular alignment with the light aperture 19 in the cap 16 and within the confines of the channel 20 extending across the diameter of the cap and functions as a guide for motion picture films.

The size of the light aperture 18 is varied by means of the diaphragm 21 which has an angular shaped notch 22 in one edge for cooperation with the aperture 18 and said diaphragm is pivoted adjacent its outer end, as at 23, to the underside of the inner plate 13 and the near edge of said diaphragm is urged towards the location of the aperture 18 by means of a spring 24 suitably attached to the diaphragm at one end and fastened at its other end to the plate 13.

This diaphragm is moved away from the light aperture 18 by a cam 25 in the form of a disc having a cam groove with which an edge of the diaphragm registers. Said cam is mounted on the lower end of a shaft 26 which projects through the plate 13 and the cap 16 and has a resilient crank handle 27 mounted on its upper end and said crank handle has a protuberance on the underside to be engaged in one of the series of indentations 28 formed in the top surface of the cap 16. To regulate the amount of light passing through the apertures 18 and 19 to the films, the handle 27 is shifted in the proper direction until it is in engagement with a preselected indentation, where it will remain until sufficient force is applied to disengage the protuberance from the indentation for some other adjustment.

Within the track channel 20 adjacent one side thereof, is formed an elongated aperture 29 so as to be in line with the perforations at the side of positive and negative motion picture films 30 and 31 respectively.

A depending bracket 32 projects from the bottom of the cap 16 and in this is mounted a screw 33 or some equivalent such as a headed pin, and the body of said screw is straddled by the bifurcated end 34 of an arm 35 carried by the follower 36 having a rectangular opening 37 and from said follower projects a single tooth 38 for movement horizontally and vertically. Said tooth, at certain times is projected into the elongated aperture 29, moved lengthwise thereof, withdrawn, and then moved backward and again projected into the aperture for intermittently moving the films along the track channel 20.

These movements are caused by a cam 29 of general equilateral triangular shape having convex edges, which is set within the rectangular opening 37 in the cam follower 36 and said cam is mounted on the driving shaft 40 journalled in suitable brackets depending from the cap 16 and projecting outside of the shell or body of the housing 11. On the extreme outer end of the shaft is mounted one member 41 of a clutch device here shown as a disc fixed to the shaft 40 and carrying a pin or projection 42 in the path of travel of another pin or projection 43 carried by the pulley 44 which is slidably and revolvably mounted upon the shaft 40 adjacent the clutch member 41, and therefore in addition to its use as a driving wheel, it also functions as the other member of the clutch device.

Power from any suitable source, such as a motor, not shown, mounted on the base 10 is transmitted through a belt to the pulley 44 and when said pulley is retracted as shown in Fig. 1, it will run free upon the shaft 40, but when shifted to the outer position indicated by dotted lines, the clutch will be in engagement and motion will be transmitted to the shaft 40 to cause the cam 39 to actuate the film feeding mechanism.

In order to manually shift the pulley 44 from one position to another, a forked gear shift lever 45 is engaged in the hub of the pulley 44 and projects upwardly and over the top face of the cap so as to be readily accessible to the operator or the printer. This gear shift lever is fixed to a rod that is slidably mounted in some of the brackets depending from the cap.

Figure 4:
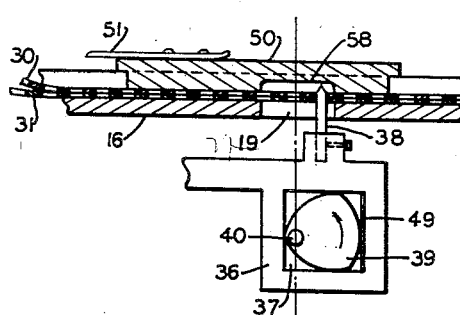
Figs. 4, 5 and 6 are diagrammatic views of the film feeding mechanism showing the parts in several different positions.
Figure 5:
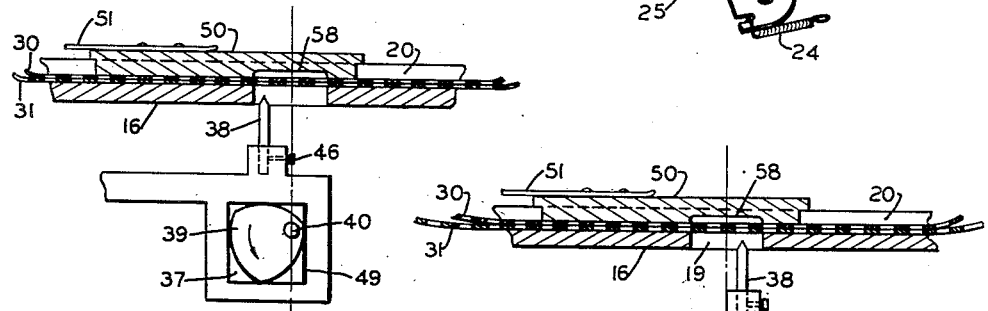
Figure 6:
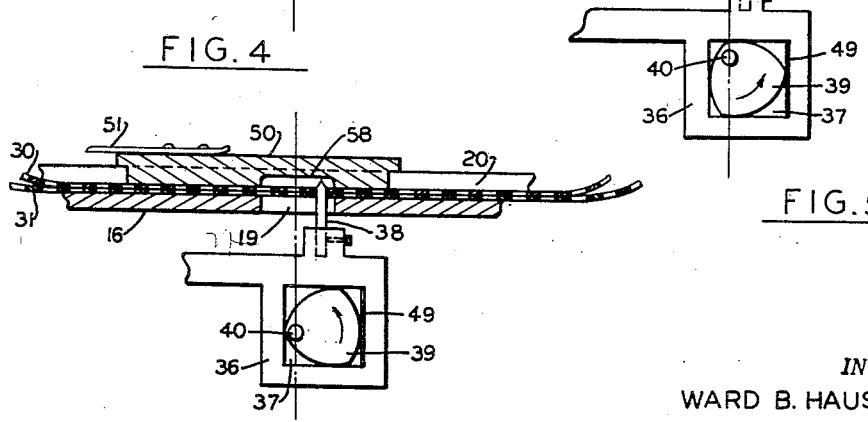

As depicted in Figs. 4, 5 and 6, the tooth 38 may be separate from the follower and merely set in a hole in said follower and held in place by a set screw 46. In order to keep the follower 36 in position and prevent it from slipping off the cam laterally in either direction, collars 47 and 48 may be mounted on the shaft 40 on opposite sides of the cam follower.

In order to prevent any lost motion during the time the feeding mechanism is actuating the films or returning for re-engagement therewith, a spring 49 is inserted in the cam follower along one of the vertical side edges to engage the cam for urging it into constant engagement with the opposite side of the cam follower.

The films 30 and 31 are held in the track channel 20 under a resilient tension particularly in the region of the location of the tooth 38 and the elongated opening 29 by means of a colored transparent block or plate 50, which may be a piece of glass, plastic or other appropriate material, and said block or plate is of sufficient size or length to also cover the light aperture 19 and is fashioned to snugly fit into the track channel 20. Said block or plate 50 is mounted on an arm 51 fixed to an axle 52 journalled in brackets 53 and having a handle 54 for rotating said axle. A sleeve 55 is also fixed on the axle 52 and has a flat surface 56 so positioned as to be substantially horizontal or parallel with the outer surface of the cap 16 when the transparent plate 50 is in the closed position shown in Figs. 2, 4, 5 and 6. Resilient pressure is applied to said sleeve by means of a flat spring 57 having one end secured to the cap and the other end resting on said sleeve, and under certain conditions engaging the flat surface 56.

The transparent plate 50 is provided with a recess 58 in line with the light aperture 19 to accommodate the point of the single tooth or pin 38 when the latter is projected upwardly through the apertures in the films.

A rotary shutter 59 is mounted on the lower end of a vertical shaft 60 which is journalled in a bracket 61. On said vertical shaft is a worm gear 62 that meshes with a worm gear 63 on the shaft 40 and said gears are so timed that the shutter 59 will make one complete revolution during one complete motion of the cam follower 36, to permit light to pass through the films only when they are stationary.

On the base 10 is mounted a standard 64 which projects upwardly at a slight angle so as to lean towards the housing 11, and from one side of said standard projects a pair of spaced trunnions 65 and 66 to receive the reels 67 and 68 carrying the positive and negative films 30 and 31 respectively, and said reels are held in place by a retaining bar 69, having its lower end journalled at 70 near the bottom of the standard 64 and urged toward the trunnions by a spring 71. An arm 72 projects from the standard 64 towards the housing 11 at approximately the same height as the surface of the track channel 20 for the films and at the outer end of said arm are a pair of spaced guide pins 73 through which the films pass from the reels to the track channel.

In the lamp chamber 14 is located any suitable source of light, such as an electric lamp 74, located near the bottom of the lamp chamber and in line with the light apertures, and preferably said lamp is mounted in a socket secured to the base 10 within the housing or shell 11, having suitable electrical connections for lighting the lamp 74.

In operation, the reel of negative film is placed on the lower trunnion 65 and the film 31 then threaded between the guide pins 73, and with the transparent plate 50 raised or in any open position, said film is laid in the track channel 20. Likewise, the reel of positive film is placed on the upper trunnion 66 and the positive film 30 threaded between the guide pins 73 and laid in the track channel on top of the negative film, after which the transparent plate 50 is lowered or closed against the films as plainly shown in Figs. 4, 5 and 6.

The clutch members are now interengaged and motion will be transmitted to the shutter 59 and the cam 39. As the cam 39 is revolved, it will lift the cam follower 36 and project the single tooth or pin 38 through the elongated opening 29 adjacent the rear end thereof and then move the cam follower forward in an almost straight horizontal line, since the bifurcated end 34 will ride upward on the screw 33 instead of having a fixed fulcrum which would tend to tilt the cam follower. As the cam continues to rotate it will retract the pin or single tooth 38 from the elongated opening 19 and then impart a retrograde movement to the cam follower finally moving it into position for its next upward stroke. This cycle of movements of the cam follower will cause the single tooth or pin to enter coinciding perforations in the two films and move them forward one step, then be disengaged therefrom and move downwardly and rearwardly and again upwardly to engage other coinciding perforations in the films at a suitable distance from the previously engaged ones for again moving the films a sufficient distance to constitute another step equal to the area of an exposure on the negative film.

During the time the films are being moved, the shutter 59 will intercept the rays of light emanating from the lamp 74, so that light will pass through the films only for the relatively short time while they are stationary.

The light apertures can be varied by the adjustment of the diaphragm 21 as previously mentioned and this can be done from the top of the housing while the effect is viewed through the transparent colored plate 50.

Of course I do not wish to be limited to the exact details of construction herein shown and described, as these may be varied within the scope of the appended claims without departing from the spirit of my invention.

Having described my invention, what I claim as new and useful is:

1. In a film printer, a suitable housing, a cap thereon having a track channel in one of its diameters on the outer surface, said cap also having a light opening and an elongated opening within the area of the track channel, a shaft journalled beneath the cap to be revolved from the outside of the housing, a triangular cam fixed on said shaft, a cam follower having a rectangular aperture and surrounding said cam, an arm projecting from said follower and having a bifurcated end in angular relation to the arm, a pin located below the cap and straddled by said bifurcated end, and a single tooth carried by said follower and projectable through the elongated opening.

2. The film printer of claim 1 wherein the tooth is separate from the follower and set in a hollow therein, and means to hold said tooth in place.

3. The film printer of claim 1 in combination with a spring located in the rectangular opening of the follower at one side thereof and coacting with the cam.

4. The film printer of claim 1 in combination with collars mounted on the shaft, one on each side of the cam and follower.

5. A film printer comprising a base, a housing mounted on said base in a vertical position, a cap and plate assembly including a plate having a light aperture, the cap having a track channel, an elongated opening and a light aperture and posts connecting the cap and plate, the light apertures in the plate and cap being in vertical alignment, a driving shaft journalled in suitable brackets carried by the cap and depending therefrom said shaft to be revolved from the outside of the housing, a triangular cam on said shaft, a follower having a rectangular opening embracing said cam whereby the revolving of the cam will move the follower upward in a substantially straight line and then forwardly and then downwardly and then rearwardly, a single tooth carried by said follower for projection through the elongated opening to engage apertures in superimposed films in the track channel, an arm projecting from the follower and having an inclined bifurcated outer end, a fixed pin straddled by said bifurcated end, a worm gear on the driving shaft, a vertical countershaft, a worm gear on the latter meshing with the first mentioned worm gear, a shutter fixed on the vertical shaft to be intermittently disposed between the two light apertures, an inclined standard mounted on the base and having an arm projecting towards the housing at approximately the height of the top of the cap, spaced guides on said arm, a pair of trunnions on the standard, a spring actuated rod to engage the trunnions in spaced relation to the standard to hold film reels thereon, and a lamp in the lower part of the housing.

WARD B. HAUSMAN.

REFERENCES CITED

The following references are of record in the file of this patent:

UNITED STATES PATENTS

| Number | Name | Date |
|---|---|---|
| 516,861 | Fawcett | Mar. 20, 1894 |
| 1,152,599 | Carleton et al. | Sept. 7, 1915 |
| 1,340,511 | White | May 18, 1920 |
| 1,484,701 | De Brie | Feb. 26, 1924 |
| 1,779,947 | Newman | Oct. 28, 1930 |
| 1,832,294 | Gent | Nov. 17, 1931 |
| 1,914,398 | Bornmann | June 20, 1933 |
| 1,976,338 | Fritts | Oct. 9, 1934 |
| 2,043,901 | Mihalyi | June 9, 1936 |
| 2,134,483 | Killman et al. | Oct. 25, 1938 |
| 2,233,255 | Friedell | Feb. 25, 1941 |
| 2,356,885 | Reeves | Aug. 29, 1944 |
| 2,368,779 | Pyles et al. | Feb. 6, 1945 |
| 2,378,206 | Fitch et al. | June 12, 1945 |
| 2,420,444 | Ress | May 13, 1947 |
| 2,464,761 | Haff | Mar. 15, 1949 |